United States Patent [19]

Bye

[11] 4,336,142

[45] Jun. 22, 1982

[54] REMOVAL OF HEAVY METALS WITH GAMMA DICALCIUM SILICATE

[75] Inventor: Gerald C. Bye, Gravesend, England

[73] Assignee: Blue Circle Industries Limited, London, England

[21] Appl. No.: 240,568

[22] Filed: Mar. 4, 1981

Related U.S. Application Data

[63] Continuation of Ser. No. 127,031, Mar. 3, 1980, abandoned, which is a continuation of Ser. No. 933,620, Aug. 14, 1978, abandoned.

[30] Foreign Application Priority Data

Aug. 25, 1977 [GB] United Kingdom ............... 35692/77

[51] Int. Cl.$^3$ .............................................. C02F 1/52
[52] U.S. Cl. .................................. 210/724; 210/726; 210/751; 210/912; 210/913; 405/129; 405/263; 423/331
[58] Field of Search ............... 106/73.6, 120; 210/609, 210/702, 710, 711, 716, 717, 724, 726, 751, 912–914; 405/128, 129, 263; 423/326, 331

[56] References Cited

U.S. PATENT DOCUMENTS

| | | | |
|---|---|---|---|
| 3,827,984 | 8/1974 | Kawert | 210/716 |
| 3,841,102 | 10/1974 | Cinner et al. | 210/751 |
| 3,931,007 | 1/1976 | Sugano et al. | 210/717 |
| 3,980,558 | 9/1976 | Thompson | 210/751 |
| 4,012,320 | 3/1977 | Conner et al. | 210/711 |
| 4,118,227 | 10/1978 | Shiohara et al. | 106/306 |

FOREIGN PATENT DOCUMENTS

| | | | |
|---|---|---|---|
| 2723452 | 12/1977 | Fed. Rep. of Germany | 423/331 |
| 50-00655 | 1/1975 | Japan | 210/912 |
| 944127 | 12/1963 | United Kingdom . | |
| 473679 | 9/1975 | U.S.S.R. | 210/912 |

Primary Examiner—Peter A. Hruskoci
Attorney, Agent, or Firm—Diller, Ramik & Wight

[57] ABSTRACT

According to the present invention we provide a method of controlling the heavy metal content of the water in an aqueous system which comprises incorporating in the system an amount of gamma dicalcium silicate to insolubilize heavy metals present.

10 Claims, No Drawings

REMOVAL OF HEAVY METALS WITH GAMMA DICALCIUM SILICATE

This application is a continuation of application Ser. No. 127,031, filed Mar. 3, 1980, now abandoned, which is a Rule 60 continuation of Ser. No. 933,620, filed Aug. 14, 1978, now abandoned.

The present invention relates to an inorganic material useful as a precipitating or insolubilising agent for heavy metals in the purification of water, and particularly to a method of controlling heavy metal content in water by means of such material.

It is known that silicates, aluminates and aluminosilicates of calcium precipitate heavy metals (e.g. copper, zinc) when they are added as solids to water containing salts of these metals (Shevyakov, A. M. and Federov, N. F., Izv. Akad. Nauk., SSSR Neorg. Mater 3 (11) 2088 (1967) and British Patent Specification No. 1,352,108). It is also known that the hydration products of the silicates and their mixtures with aluminates precipitate heavy metals (Tohyama I., Mizu Shori Gijutsu, 14 (5) 463 (1973)).

The use of lime to raise the pH of a solution containing heavy metal salts has long been practised but the use of the silicates, which in fact hydrolyse in water to form a base, has advantages in collecting the precipitated metal hydroxides and basic salts especially when metal ion concentrations to be precipitated are low.

This invention is based on our finding that the silicates and aluminosilicates which have previously been employed as precipitating agents can advantageously be replaced by the non-hydraulic gamma dicalcium silicate, which lies outside the composition range previously proposed for such agents. Portland cement or cement clinker ground without the gypsum used in Portland cement manufacture is an effective precipitant but it has the disadvantage of being too reactive with water and also of containing alkali metal (sodium and potassium) sulphates which will pass into the effluent water. The normal form of dicalcium silicate—the beta form present in cement—can be used effectively by itself as a precipitant but although it is far less reactive than cement it too agglomerates when slurried with water and if overdoses are used as a precipitant it can form sediments difficult to handle in bulk.

Synthetic wollastonite (the monocalcium silicate) is a precipitant but it has a lower capacity in this process owing to its lower lime content.

According to the present invention we provide a method of removing heavy metal from an aqueous system contaminated with heavy metal which comprises the step of incorporating in the system an amount of gamma dicalcium silicate effective to insolubilize heavy metal present.

Gamma dicalcium silicate has the advantage that it does not hydrate (hydrolyse) in water at neutral or higher pH, but will decompose and liberate lime in contact with a solution of a heavy metal since by hydrolysis most solutions of heavy metals are slightly acidic.

Gamma dicalcium silicate also has the advantage that when it is manufactured, the form of dicalcium silicate existing at high temperature inverts on cooling to the gamma form with a 10 percent increase in specific volume. This is accompanied by a breakdown of the hard mass of clinker into a dust, thus obviating the need for expensive grinding processes.

Gamma dicalcium silicate may be manufactured by burning a calcareous material such as chalk or limestone and a high silica content shale, sand or flint. These must be heated in the range 1200°–1400° C. either in the absence of all substances which stabilise the beta form (such as phosphates, or borates) or under kiln conditions such that stabilisers such as potassium oxide are largely volatilised.

An alternative source of gamma dicalcium silicate is by way of the Grzymek Process (British Patent Specification No. 944,127) in which a slime consisting largely of gamma dicalcium silicate is left after the extraction of alumina by alkali.

The gamma dicalcium silicate may be used in the purification of water according to the invention in a number of ways.

It may be added as a powder or the latter may first be pelletised, nodulised or otherwise agglomerated. In order to maximise the contact between solid and aqueous solution, the pellets would be made with a high porosity. The gamma dicalcium silicate can also be used as a slurry with the advantage previously stated that agglomeration in the slurry will be minimised.

In the form of a bed of pellets, for example, continuously exposed to a flow of water with varying content of heavy metals and varying pH the gamma dicalcium silicate would have the advantage of being relatively dormant when water near the neutral point (pH 7) was passing through the bed.

Materials other than heavy metals forming calcium salts insoluble in neutral or slightly alkaline conditions would also be precipitated in the method of the invention.

These other materials include certain organic acids, and fluoride and phosphate ions. The precipitation of the latter could be made more efficient by treating the water with a salt of iron or aluminium before exposing it to the silicate. This would react with the acid solution and the resulting increase in pH would precipitate very insoluble phosphates of these metals. Examples of suitable salts are aluminium sulphate and a waste solution such as ferric chloride (produced in rutile manufacture).

The invention may be applied in ways other than in the purification of water. Examples of applications other than to heavy metal precipitation from waste waters are: use of gamma dicalcium silicate as an additive in landfilling with wastes to prevent the leaching of metals into the water table and as an additive to contaminated soils or sewage sludge to prevent heavy metals being extracted from these by plants. In these applications as in water purification treatment the gamma dicalcium silicate would have the advantage of being relatively high in lime content without being too reactive and having a tendency to cause agglomeration and cementing of the system under neutral/alkaline conditions.

It has been found that the final pH ranges for the resulting supernatant solution, for optimum precipitation in the practice of the invention, are:
  9 to 11 for divalent metals, e.g. Cu, Ni;
  7 to 9 for trivalent metals, e.g. Al, Fe, Cr, which will also coprecipitate divalent metals.

The application of the gamma dicalcium silicate in the method of the invention is limited to those metal ions which are insoluble under mildly alkaline conditions. For example it will remove Cr(III) as efficiently from solution as it will Ni or Cu, but it will not precipitate Cr(VI) which forms stable chromates under alkaline conditions. Similarly it will not precipitate Zn and Cd in the presence of cyanide ions with which Zn and Cd form complexes soluble in an alkaline medium.

Examination of the material precipitated by gamma dicalcium silicate from copper sulphate solution indicates that it is a complex mixture of basic sulphates. The coarseness of these crystalline substances results in relatively rapid sedimentation compared with that of the amorphous, gelatinous "hydroxide" precipitated by lime or caustic alkali.

The following Examples are given to illustrate the invention. The composition of the gamma dicalcium silicate employed can be expressed (by weight) as CaO 65.1 percent; $SiO_2$ 34.9 percent; with free lime 0.2 percent. It is produced from the kiln as a powder similar in fineness to an ordinary Portland cement, 3.3 percent being retained on a 90 $\mu$m sieve and 14.6 percent being retained on a 45 $\mu$m sieve.

EXAMPLE 1—REMOVAL OF COPPER 500 ml of a solution of copper sulphate containing 50 mg per liter copper (pH 4.5) were treated with 0.25 g gamma dicalcium silicate and shaken for 2 hours. The residual concentration was less than 1 mg per liter. An additional 175 mg of copper as copper sulphate was added in four increments to bring the concentration up to 50 mg per liter (once) and then up to 100 mg per liter three times. Only with the final addition did the residual concentration rise above 1 mg per liter (to 20 mg per liter) and the total take up of Cu per gram of gamma dicalcium silicate was 760 mg. The precipitate settled readily at all stages but the final sediment was easily re-suspended even after storage for three days. Final pH at each intermediate stage was in the range 9–11.

EXAMPLE 2—REMOVAL OF NICKEL 250 ml of a 5 mg per liter solution of Ni as the sulphate were treated with 0.5 g gamma dicalcium silicate by shaking for 2 hours. The residual concentration of Ni was 2 mg per liter indicating a capacity of 249 mg nickel per gram of gamma dicalcium silicate.

The rate of precipitation of nickel depended on the initial concentration of Ni. At low concentrations the concentration was reduced rapidly to below 1 mg per liter. For example the concentration of 250 ml of a solution originally containing 50 mg per liter Ni was reduced by shaking with 1 gram of gamma dicalcium silicate to below 1 mg per liter in 5 minutes.

When 250 ml of a solution containing 800 mg per liter were shaken with 1 gamma of gamma dicalcium silicate the following results were obtained.

| Time (min) | Residual concentration mg per liter | mg Ni per g dicalcium silicate |
|---|---|---|
| 5 | 680 | 30 |
| 15 | 590 | 53 |
| 30 | 470 | 83 |
| 60 | 170 | 158 |
| 120 | 2 | 199.5 |

EXAMPLE 3—REMOVAL OF COPPER AND NICKEL 250 ml of a trade effluent (pH 7.4) of unknown origin containing 3.5. mg per liter copper and 18 mg per liter nickel were shaken for 2 hours with 1 gram gamma dicalcium silicate. Residual concentrations were approximately 0.4 mg per liter Cu and 0.5 mg per liter Ni.

EXAMPLE 4—REMOVAL OF ZINC 100 ml of a solution containing 25 mg per liter Zn (as zinc sulphate) were shaken with 0.2 g gamma dicalcium silicate for 2 hours. The final supernatant liquid had a pH of 9.7 and contained less than 0.1 mg per liter Zn. 100 ml of a further solution containing 100 mg per liter Zn were treated with 1 gram gamma dicalcium silicate. The remaining supernatant liquid had a pH of 9.4 and contained 0.1 mg per liter Zn. Where the solution was treated with insufficient gamma dicalcium silicate so that the final solution pH fell below 9, the precipitation was incomplete.

EXAMPLE 5—REMOVAL OF CADMIUM 500 ml of a solution of cadmium sulphate (pH 6.2) containing 30 mg per liter was shaken for 2 hours with 1 gram gamma dicalcium silicate. The pH of the final supenatant liquid was 11.1 and it contained 0.3 mg per liter residual Cd.

EXAMPLE 5—TREATMENT OF ACID MINE WATER 250 ml of a sample of mine water having a pH of 2.8 and containing 2650 mg per liter iron and 300 mg per liter aluminium, were shaken for 2 hours with 4 g gamma dicalcium silicate. The pH of the supernatant liquor was then 7.4 and it contained 2 mg per liter of iron and 4 mg per liter of aluminium.

I claim:

1. A method of removing a heavy metal, whose ions are insoluble in an aqueous medium having a pH in the range of 7–11, from an aqueous system contaminated with ions of said heavy metal, which comprises the steps of (1) contacting the heavy metal ions in the aqueous system with an amount of gamma dicalcium silicate effective to establish a final pH in the aqueous system in the range of 7–11 and to insolubilize said heavy metal present, and (2) separating the insolubilized heavy metal from the aqueous system.

2. A method according to claim 1, wherein the heavy metal includes trivalent metal and the pH value of the aqueous system after insolubilisation of the heavy metal is from 7 to 9.

3. A method according to claim 2, wherein the heavy metal comprises aluminium, chromium or iron.

4. A method according to claim 1, wherein the heavy metal is divalent and the pH value of the aqueous system after insolubilization of the heavy metal is from 9 to 11.

5. A method according to claim 4, wherein the heavy metal comprises cadmium, copper, nickel or zinc.

6. A method according to claim 1, wherein the gamma dicalcium silicate is in the form of a powder.

7. A method according to claim 1, wherein the gamma dicalcium silicate is in the form of pellets.

8. A method according to claim 7, wherein the pellets are arranged in the form of a bed of pellets, and the aqueous system is contacted with said gamma dicalcium silicate by passing said aqueous system through said bed.

9. A method according to claim 1, wherein the gamma dicalcium silicate is in the form of a slurry.

10. A method according to claim 1, wherein a salt of iron or aluminium is added to the system before said contacting with the gamma dicalcium silicate.

* * * * *